(12) United States Patent
Tashino et al.

(10) Patent No.: US 9,315,601 B2
(45) Date of Patent: Apr. 19, 2016

(54) SOLID CATALYST COMPONENT FOR OLEFIN POLYMERIZATION, AND CATALYST

(75) Inventors: Kunihiko Tashino, Chigasaki (JP); Takashi Fujita, Chigasaki (JP); Toshiya Uozumi, Chigasaki (JP); Yuta Haga, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 78 days.

(21) Appl. No.: 14/130,799

(22) PCT Filed: May 31, 2012

(86) PCT No.: PCT/JP2012/064076
§ 371 (c)(1),
(2), (4) Date: Jan. 3, 2014

(87) PCT Pub. No.: WO2013/005513
PCT Pub. Date: Jan. 10, 2013

(65) Prior Publication Data
US 2014/0135205 A1     May 15, 2014

(30) Foreign Application Priority Data

Jul. 4, 2011    (JP) .................................. 2011-148269

(51) Int. Cl.
*B01J 21/00*     (2006.01)
*B01J 23/00*     (2006.01)
(Continued)

(52) U.S. Cl.
CPC .................................... *C08F 110/06* (2013.01)

(58) Field of Classification Search
USPC .......................... 502/127, 100, 103, 118, 125
See application file for complete search history.

(56) References Cited

U.S. PATENT DOCUMENTS

2002/0183194 A1* 12/2002 Bhaduri .................. C08F 10/00
502/102
2003/0130109 A1* 7/2003 Tashino .................. C07C 69/80
502/118

(Continued)

FOREIGN PATENT DOCUMENTS

JP       57 63310      4/1982
JP       57 63311      4/1982

(Continued)

OTHER PUBLICATIONS

U.S. Appl. No. 14/240,588, filed Mar. 14, 2014, Uozumi, et al.

(Continued)

*Primary Examiner* — James McDonough
(74) *Attorney, Agent, or Firm* — Oblon, McClelland, Maier & Neustadt, L.L.P.

(57) ABSTRACT

A solid catalyst component for olefin polymerization and a catalyst are disclosed that exhibit high catalytic activity when used for gas-phase polymerization, suppress rapid reactions in the initial stage of polymerization relative to the polymerization activity, and can produce a propylene polymer in high yield while maintaining high stereoregularity. The solid catalyst component for olefin polymerization includes magnesium, titanium, a halogen, and an internal electron donor, the solid catalyst component including an asymmetrical phthalic diester represented by the following general formula (1) in a molar ratio of 0.2 to 0.8 relative to the total content of the internal electron donor.

$$R^1_k(C_6H_{4-k})(COOR^2)(COOR^3) \qquad (1)$$

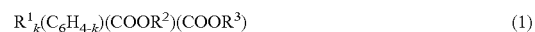

wherein $R^1$ is an alkyl group or the like, $R^2$ is a linear or branched alkyl group having 2 to 6 carbon atoms or an alkenyl group, $R^3$ is a linear or branched alkyl group having 1 to 5 carbon atoms, the number of carbon atoms included in $R^3$ being smaller than the number of carbon atoms included in $R^2$, and k is an integer from 0 to 4 that indicates the number of substituents $R^1$.

11 Claims, 1 Drawing Sheet

(51) Int. Cl.
*B01J 25/00* (2006.01)
*B01J 29/00* (2006.01)
*B01J 31/00* (2006.01)
*B01J 37/00* (2006.01)
*C08F 110/06* (2006.01)

(56) References Cited

U.S. PATENT DOCUMENTS

2010/0174038 A1* 7/2010 Hirahata ............... C08F 10/00 526/127
2014/0128549 A1* 5/2014 Kheirandish ........... C08L 23/12 525/240

FOREIGN PATENT DOCUMENTS

| JP | 64 6006 | 1/1989 |
| JP | 2001 106718 | 4/2001 |
| JP | 2001 302717 | 10/2001 |
| JP | 2010 168547 | 8/2010 |
| JP | 2010 275382 | 12/2010 |

OTHER PUBLICATIONS

International Search Report Issued Jul. 17, 2012 in PCT/JP12/64076 Filed May 31, 2012.
U.S. Appl. No. 14/131,052, Jan. 6, 2014, Uozumi, et al.

* cited by examiner (A) TRANSITION METAL COMPONENT
(a) MAGNESIUM COMPOUND
(b) TITANIUM COMPOUND
(c) PHTHALIC DIESTER *1
(d) PHTHALIC DIESTER *2
(b) TITANIUM COMPOUND
(b) TITANIUM COMPOUND (B) ORGANOALUMINUM COMPONENT —— OLEFIN POLYMERIZATION CATALYST
$R^1_p AlQ_{3-p}$ (C) ELECTRON DONOR COMPOUND
$R^2_q Si(OR^3)_{4-q}$

*1 : $R^1_k (C_6H_{4-k})(COOR^2)(COOR^3)$
*2 : $R^4_m (C_6H_{4-m})(COOR^2)_2$

SOLID CATALYST COMPONENT FOR OLEFIN POLYMERIZATION, AND CATALYST

TECHNICAL FIELD

The invention relates to a solid catalyst component for olefin polymerization and a catalyst that exhibit high activity when used for gas-phase polymerization of an olefin.

BACKGROUND ART

A solid catalyst component that includes magnesium, titanium, an electron donor compound, and a halogen as essential components has been known as a catalyst component used for polymerization of an olefin. A number of olefin polymerization methods have been proposed that polymerize or copolymerize propylene in the presence of an olefin polymerization catalyst that includes the solid catalyst component, an organoaluminum compound, and an organosilicon compound. For example, JP-A-57-63310, JP-A-57-63311, and JP-A-1-6006 disclose a method that polymerizes an olefin having 3 or more carbon atoms using a catalyst that includes a solid catalyst component, an organoaluminum compound, and an organosilicon compound having an Si—O—C linkage, the solid catalyst component including a magnesium compound, a titanium compound, and a diester compound (e.g., phthalic diester) (i.e., electron donor).

RELATED-ART DOCUMENT

Patent Document

Patent Document 1: JP-A-57-63310
Patent Document 2: JP-A-57-63311
Patent Document 3: JP-A-1-6006

SUMMARY OF THE INVENTION

Technical Problem

However, a known olefin polymerization catalyst is a solid catalyst that generally exhibits high polymerization activity, but shows a phenomenon in which a strong exothermic reaction occurs in the initial stage of polymerization, and the polymerization activity rapidly decreases with the passage of time (i.e., exhibits high initial activity). For example, when using a solid catalyst that exhibits high initial activity for gas-phase polymerization of propylene, the solid catalyst particles may easily break due to heat generated during the polymerization reaction, and a large amount of fine powdery polymer may be produced, or the resulting fine powdery polymer may be melted and aggregate. In such a case, it may be necessary to terminate the polymerization process.

A known olefin polymerization catalyst may exhibit high polymerization activity when used for liquid polymerization (bulk polymerization) of propylene, but may show a decrease in polymerization activity when used for gas-phase polymerization (gas polymerization) of propylene (i.e., may show a difference in polymerization activity depending on the polymerization method). Therefore, an improvement has been required for a known olefin polymerization catalyst. Moreover, since a known olefin polymerization catalyst does not maintain its polymerization activity for a long time, only a small amount of rubber component can be produced in the second or subsequent stage of polymerization when producing a copolymer such as an impact copolymer by multi-step polymerization. Therefore, a polymerization catalyst that does not pose the above problems (i.e., a polymerization catalyst that exhibits high activity, but shows suppressed initial activity) has been desired for a gas-phase polymerization process that has been mainly employed in recent years.

An object of the invention is to provide a solid catalyst component for olefin polymerization and an olefin polymerization catalyst that exhibit long-lasting activity (i.e., exhibit suppressed activity in the initial stage of olefin polymerization, and maintain the olefin polymerization activity for a long time).

Solution to Problem

In view of the above situation, the inventors of the invention conducted extensive studies in order to achieve the above object. As a result, the inventors found that a solid catalyst component for olefin polymerization that includes an asymmetrical phthalic diester that includes two different ester residues at a specific concentration exhibits long-lasting activity (i.e., exhibits suppressed activity in the initial stage of olefin polymerization, and maintains its olefin polymerization activity for a long time). This finding has led to the completion of the invention.

According to one aspect of the invention, a solid catalyst component for olefin polymerization includes magnesium, titanium, a halogen, and an internal electron donor, the solid catalyst component including an asymmetrical phthalic diester represented by the following general formula (1) in a molar ratio of 0.2 to 0.8 relative to the total content of the internal electron donor.

$$R^1_k(C_6H_{4-k})(COOR^2)(COOR^3) \quad (1)$$

wherein $R^1$ is a halogen atom or an alkyl group having 1 to 20 carbon atoms, $R^2$ is a linear or branched alkyl group having 2 to 6 carbon atoms, or an alkenyl group, $R^3$ is a linear or branched alkyl group having 1 to 5 carbon atoms, the number of carbon atoms included in $R^3$ being smaller than the number of carbon atoms included in $R^2$, and k is an integer from 0 to 4 that indicates the number of substituents $R^1$.

According to another aspect of the invention, an olefin polymerization catalyst includes (A) the solid catalyst component for olefin polymerization according to one aspect of the invention (hereinafter may be referred to as "solid catalyst component (A)"), (B) an organoaluminum compound represented by the following general formula (4), and (C) an external electron donor compound, $$R^6_p AlQ_{3-p} \quad (4)$$

wherein $R^6$ is an alkyl group having 1 to 4 carbon atoms, Q is a hydrogen atom or a halogen atom, and p is an integer that satisfies $0 < p \leq 3$.

Advantageous Effects of the Invention

The solid catalyst component for olefin polymerization and the olefin polymerization catalyst according to the aspects of the invention exhibit suppressed activity in the initial stage of olefin polymerization, and maintain the olefin polymerization activity for a long time when used for polymerization of an olefin.

DESCRIPTION OF EMBODIMENTS

Solid Catalyst Component for Olefin Polymerization

Figure 1:
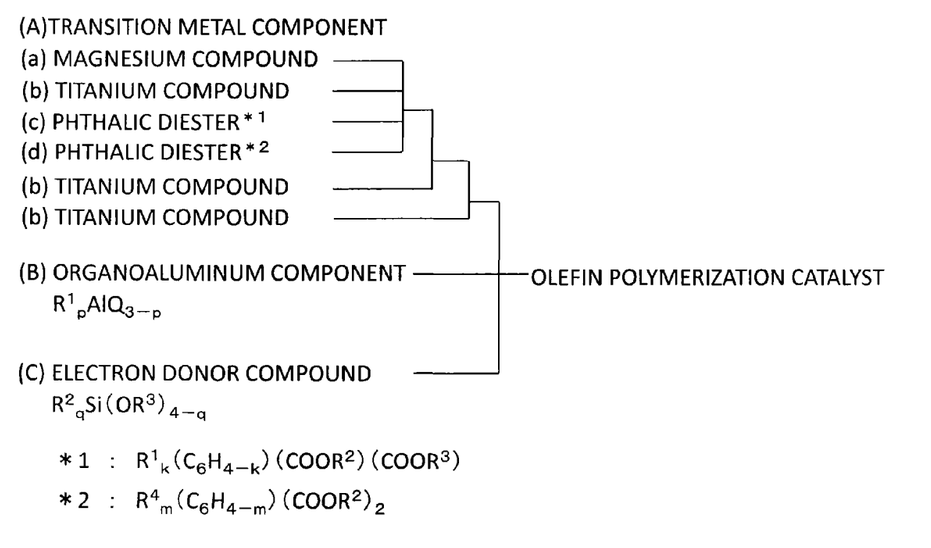
FIG. 1 is a flowchart illustrating a process for producing a polymerization catalyst according to one embodiment of the invention.

Examples of the halogen included in the solid catalyst component (A) include fluorine, chlorine, bromine, and iodine. Among these, chlorine, bromine, and iodine are preferable.

The solid catalyst component (A) includes the asymmetrical phthalic diester represented by the general formula (1) (hereinafter may be referred to as "asymmetrical phthalic diester (d)" or "component (d)"), and an internal electron donor other than the component (d), as the internal electron donor.

$R^1$ in the general formula (1) is a halogen atom or an alkyl group having 1 to 20 carbon atoms, and preferably a chlorine atom, a bromine atom, a methyl group, an ethyl group, a propyl group, or a butyl group.

$R^2$ in the general formula (1) is a linear or branched alkyl group having 2 to 6 carbon atoms, or an alkenyl group, and preferably an ethyl group, an n-propyl group, an isopropyl group, an n-butyl group, a t-butyl group, an isobutyl group, an n-pentyl group, an isopentyl group, a neopentyl group, an n-hexyl group, or a thexyl group.

$R^3$ in the general formula (1) is a linear alkyl group having 1 to 5 carbon atoms, a branched alkyl group, or an alkenyl group, and preferably a methyl group, an ethyl group, an n-propyl group, or an isopropyl group, the number of carbon atoms included in $R^3$ being smaller than the number of carbon atoms included in $R^2$. k in the general formula (1) is preferably 0, 1, or 2, and more preferably 0 or 1.

Specific examples of the component (d) include methylethyl phthalate, (ethyl)n-propyl phthalate, ethylisopropyl phthalate, (ethyl)n-butyl phthalate, ethylisobutyl phthalate, (ethyl)n-pentyl phthalate, ethylisopentyl phthalate, ethylneopentyl phthalate, (ethyl)n-hexyl phthalate, and the like. Among these, (ethyl)n-propyl phthalate, ethylisopropyl phthalate, (ethyl)n-butyl phthalate, and ethylisobutyl phthalate are particularly preferable. One compound or two or more compounds selected from the asymmetrical phthalic diesters represented by the general formula (1) may be used as the component (d).

Examples of the internal electron donor other than the component (d) include a phthalic diester represented by the following general formula (2) (hereinafter may be referred to as "phthalic diester (e)" or "component (e)"), and a phthalic diester represented by the following general formula (3) (hereinafter may be referred to as "phthalic diester (f)" or "component (0")".

$$R^4{}_m(C_6H_{4-m})(COOR^2)_2 \qquad (2)$$

wherein $R^2$ are the same as defined above, and are identical to each other, $R^4$ is a halogen atom or an alkyl group having 1 to 20 carbon atoms, and m is an integer from 0 to 4 that indicates the number of substituents $R^4$.

$$R^5{}_n(C_6H_{4-n})(COOR^3)_2 \qquad (3)$$

wherein $R^3$ are the same as defined above, and are identical to each other, $R^5$ is a halogen atom or an alkyl group having 1 to 20 carbon atoms, and n is an integer from 0 to 4 that indicates the number of substituents $R^5$.

The component (e) is one compound or two or more compounds selected from the phthalic diesters represented by the general formula (2). Specific examples of the component (e) include di-n-propyl phthalate, diisopropyl phthalate, di-n-butyl phthalate, diisobutyl phthalate, di-n-pentyl phthalate, diisopentyl phthalate, dineopentyl phthalate, di-n-hexyl phthalate, dithexyl phthalate, di-n-butyl 4-methylphthalate, diisobutyl 4-methylphthalate, di-n-butyl 4-bromophthalate, diisobutyl 4-bromophthalate, dineopentyl 4-bromophthalate, and the like. Di-n-propyl phthalate, di-n-butyl phthalate, diisobutyl phthalate, di-n-pentyl phthalate, dineopentyl phthalate, diethyl 4-methylphthalate, di-n-propyl 4-methylphthalate, diisobutyl 4-methylphthalate, diisobutyl 4-bromophthalate, diisopentyl 4-bromophthalate, dineopentyl 4-bromophthalate are particularly preferable.

The component (f) is one compound or two or more compounds selected from the phthalic diesters represented by the general formula (3). Phthalic diesters such as dimethyl phthalate, diethyl phthalate, di-n-propyl phthalate, diisopropyl phthalate, di-n-butyl phthalate, and diisobutyl phthalate, halogen-substituted phthalic diesters such as diethyl 4-chlorophthalate, di-n-propyl 4-chlorophthalate, diisopropyl 4-chlorophthalate, di-n-butyl 4-chlorophthalate, diisobutyl 4-chlorophthalate, diethyl 4-bromophthalate, di-n-propyl 4-bromophthalate, diisopropyl 4-bromophthalate, di-n-butyl 4-bromophthalate, and diisobutyl 4-bromophthalate, and alkyl-substituted phthalic diesters such as diethyl 4-methylphthalate, di-n-propyl 4-methylphthalate, diisopropyl 4-methylphthalate, di-n-butyl 4-methylphthalate, and diisobutyl 4-methylphthalate are preferable, and dimethyl phthalate, diethyl phthalate, di-n-propyl phthalate, diisopropyl phthalate, dimethyl 4-methylphthalate, diethyl 4-methylphthalate, di-n-butyl phthalate, and diisobutyl phthalate, dimethyl 4-bromophthalate, and diethyl 4-bromophthalate are particularly preferable as the component (f). A compound used as the component (f) is determined when the component (e) has been determined taking account of the condition whereby the number of carbon atoms included in $R^3$ is smaller than the number of carbon atoms included in $R^2$. When the solid catalyst component (A) includes the component (e) and the component (f) (phthalic diester), the activity of the resulting solid catalyst component and the stereospecificity are further improved.

The solid catalyst component (A) may further include an additional component (third component) in addition to the above essential components. Examples of the additional component include aluminum compounds such as aluminum trichloride, diethoxyaluminum chloride, diisopropoxyaluminum chloride, ethoxyaluminum dichloride, isopropoxyaluminum dichloride, butoxyaluminum dichloride, and triethoxyaluminum, organic acid metal salts such as sodium stearate, magnesium stearate, and aluminum stearate, and polysiloxanes such as a chain-like, partially hydrogenated, cyclic, or modified polysiloxane that is liquid or viscous at room temperature. Examples of the chain-like polysiloxane include dimethylpolysiloxane and methylphenylpolysiloxane. Examples of the partially hydrogenated polysiloxane include methyl hydrogen polysiloxanes having a degree of hydrogenation of 10 to 80%. Examples of the cyclic polysiloxane include hexamethylcyclopentanesiloxane, 2,4,6-trimethylcyclotrisiloxane, and 2,4,6,8-tetramethylcyclotrisiloxane. Examples of the modified polysiloxane include a higher fatty acid group-substituted dimethylsiloxane, an epoxy group-substituted dimethylsiloxane, and a polyoxyalkylene group-substituted dimethylsiloxane.

The solid catalyst component (A) includes the asymmetrical phthalic diester (component (d)) in a molar ratio of 0.2 to 0.8, preferably 0.3 to 0.8, and more preferably 0.45 to 0.7, relative to the total content of the internal electron donor. When the molar ratio of the asymmetrical phthalic diester is within the above range, the resulting solid catalyst component shows suppressed heat generation in the initial stage of olefin polymerization, and maintains the olefin polymerization activity for a long time. Moreover, the polymerization activity and the stereospecificity can be further improved. The reasons that the above advantages are obtained are unclear. It is conjectured that, when the internal electron donor is used under the above specific conditions, formation of active sites that occurs when the internal electron donor is drawn from the surface of the solid catalyst component due to the organoaluminum compound, can be suppressed in the first stage of polymerization.

The molar ratio of the content of the asymmetrical phthalic diester to the total content of the internal electron donor is calculated by dividing the total number of moles of the asymmetrical phthalic diesters (component (d)) included in the solid catalyst component (A) by the total number of moles of the internal electron donor included in the solid catalyst component (A). The content of the internal electron donor included in the component (A) may be determined by collecting the internal electron donor from the component (A) by a solvent extraction method or the like, measuring the collected internal electron donor by gas chromatography or the like, and determining the content of each internal electron donor using a calibration curve that is drawn in advance using the measurement results at a known concentration, for example.

The content of titanium, magnesium, the halogen, and the internal electron donor (component (d)+component (e)+component (f)) in the solid catalyst component (A) is not particularly limited. The content of magnesium is normally 10 to 30 wt %, and preferably 15 to 25 wt %, the content of titanium is normally 1 to 8 wt %, and preferably 2 to 4 wt %, the content of the halogen is normally 45 to 70 wt %, and preferably 55 to 65 wt %, and the content of the internal electron donor is normally 2 to 25 wt %, and preferably 5 to 20 wt %. When the content of each component is within the above range, the resulting solid catalyst component shows suppressed heat generation in the initial stage of olefin polymerization, and maintains the olefin polymerization activity for a long time. Moreover, the polymerization activity and the stereospecificity can be further improved.

Method for Producing Solid Catalyst Component (A)

An example of a method for producing the solid catalyst component (A) is described below. Specifically, the solid catalyst component (A) is produced by bringing a magnesium compound (a), a titanium compound (b), an optional halogen compound (c) other than the titanium compound (b), a specific amount of the asymmetrical phthalic diester (d) represented by the general formula (1), a specific amount of the phthalic diester (e) represented by the general formula (2), and a specific amount of the optional phthalic diester (f) represented by the general formula (3), into contact with each other, and bringing the titanium compound (b) into contact with the resulting reaction product.

Magnesium Compound (a)

Examples of the magnesium compound (a) (hereinafter may be referred to as "component (a)") used to produced the solid catalyst component (A) include magnesium dihalides, alkoxymagnesium halides, dialkoxymagnesiums, and the like. It is preferable to use an alkoxymagnesium halide or a dialkoxymagnesium. It is particularly preferable to use a dialkoxymagnesium.

The magnesium dihalide is a compound represented by the general formula "$MgX_2$" (wherein X is a fluorine atom, a chlorine atom, a bromine atom, or an iodine atom). Specific examples of the magnesium dihalide include magnesium difluoride, magnesium dichloride, magnesium dibromide, and magnesium diiodide. Among these, magnesium dichloride, magnesium dibromide, and magnesium diiodide are preferable, and magnesium dichloride is particularly preferable.

The alkoxymagnesium halide is a compound represented by the general formula "$Mg(OR^9)X$" (wherein $R^9$ is a linear or branched alkyl group having 1 to 4 carbon atoms, and X is a fluorine atom, a chlorine atom, a bromine atom, or an iodine atom). The alkoxymagnesium halide is preferably methoxymagnesium chloride, ethoxymagnesium chloride, propoxymagnesium chloride, or butoxymagnesium chloride.

The dialkoxymagnesium is a compound represented by the general formula) "$Mg(OR^{10})_2$" (wherein $R^{10}$ is a linear or branched alkyl group having 1 to 4 carbon atoms). Specific examples of the dialkoxymagnesium include dimethoxymagnesium, diethoxymagnesium, di-n-propoxymagnesium, diisopropoxymagnesium, di-n-butoxymagnesium, diisobutoxymagnesium, methoxyethoxymagnesium, ethoxypropoxymagnesium, ethoxybutoxymagnesium, and the like. Among these, dimethoxy magnesium, diethoxymagnesium, di-n-propoxymagnesium, and diisopropoxymagnesium are preferable, and diethoxymagnesium is particularly preferable. These dialkoxymagnesiums may be obtained by reacting magnesium metal with an alcohol in the presence of a halogen or a halogen-containing compound.

When using the dialkoxymagnesium as the component (a) when producing the solid catalyst component (A), a granular or powdery dialkoxymagnesium having an amorphous or spherical shape may be used. For example, when using a spherical dialkoxymagnesium, the resulting polymer powder has a more excellent particle shape and a narrower particle size distribution. This improves the handling capability of the polymer powder during polymerization, and eliminates a problem (e.g., clogging) due to a fine powder included in the polymer powder.

The spherical dialkoxymagnesium need not necessarily have a perfect spherical shape, but may have an oval shape or a potato-like shape. The ratio (l/w) of the major axis diameter (l) to the minor axis diameter (w) of the spherical dialkoxymagnesium is normally 3 or less, preferably 1 to 2, and more preferably 1 to 1.5. The spherical dialkoxymagnesium may be produced using the method disclosed in JP-A-58-41832, JP-A-3-74341, JP-A-8-73388, or the like.

The average particle size of the dialkoxymagnesium is normally 1 to 200 μm, and preferably 5 to 150 μm. The average particle size of the spherical dialkoxymagnesium is normally 1 to 100 μm, preferably 5 to 50 μm, and more preferably 10 to 40 μm. It is desirable to use a dialkoxymagnesium that has a narrow particle size distribution, and has a low fine powder/coarse powder content. Specifically, it is preferable to use a dialkoxymagnesium having a content of particles having a particle size of 5 μm or less of 20% or less, and preferably 10% or less. It is preferable to use a dialkoxymagnesium having a content of particles having a particle size of 100 μm or more of 10% or less, and preferably 5% or less. The particle size distribution ln(D90/D10) (where, D90 is the particle size at 90% in the cumulative particle size distribution, and D10 is the particle size at 10% in the cumulative particle size distribution) of the dialkoxymagnesium is preferably 3 or less, and more preferably 2 or less.

Titanium Compound

The titanium compound (b) (hereinafter may be referred to as "component (b)") used to produce the solid catalyst component (A) is a trivalent or tetravalent titanium compound. Specific examples of the titanium compound (b) include titanium trihalides such as titanium trichloride, titanium tribromide, and titanium triiodide, titanium tetrahalides such as titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, trialkoxytitanium halides such as trimethoxytitanium chloride, triethoxytitanium chloride, tripropoxytitanium chloride, and tri-n-butoxytitanium chloride, and tetraalkoxytitaniums such as tetramethoxytitanium, tetraethoxytitanium, tetra(n-propoxy)titanium, tetra(isopropoxy)titanium, tetra(n-butoxy)titanium, and tetra(isobutoxy)titanium. Among these, titanium trihalides, dialkoxytitanium dihalides, and titanium tetrahalides are preferable, and titanium tetrachloride is particularly preferable. These titanium compounds may be used as the component (b) either alone or in combination.

Halogen Compound

Examples of the halogen compound (c) (hereinafter may be referred to as "component (c)") other than the titanium compound (b) that is optionally used to produce the solid catalyst component (A) include tetravalent halogen-containing silicon compounds. Specific examples of the halogen compound (c) include alkoxy group-containing halogenated silanes such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane, and tri-n-butoxychlorosilane. Silane tetrahalides are preferable, and silane tetrachloride is particularly preferable. Note that the component (c) may not be used when the component (b) is a titanium compound that includes a halogen atom.

The asymmetrical phthalic diester (d) represented by the general formula (1) that is used to produce the solid catalyst component (A) is the same as the asymmetrical phthalic diester (d) included in the solid catalyst component (A). Therefore, description thereof is omitted. The phthalic diester (e) represented by the general formula (2) that is used to produce the solid catalyst component (A) is the same as the phthalic diester (e) included in the solid catalyst component (A). Therefore, description thereof is omitted. The phthalic diester (f) represented by the general formula (3) that is optionally used to produce the solid catalyst component (A) is the same as the phthalic diester (f) included in the solid catalyst component (A). Therefore, description thereof is omitted. The additional component (third component) that is optionally used to produce the solid catalyst component (A) is the same as the additional component (third component) included in the solid catalyst component (A). Therefore, description thereof is omitted.

The components are brought into contact with each other with stirring in a vessel equipped with a stirrer that contains an inert gas atmosphere from which water and the like have been removed. The components are brought into contact with each other by stirring and mixing the components, or dispersing or suspending the components to effect modification. The components may be brought into contact with each other at a relatively low temperature around room temperature. The components brought into contact with each other are preferably reacted at 40 to 130° C. to obtain a reaction product. If the reaction temperature is less than 40° C., the reaction may not sufficiently proceed, and the resulting solid catalyst component may have insufficient performance. If the reaction temperature exceeds 130° C., it may be difficult to control the reaction due to significant solvent vaporization and the like. The transesterification of the phthalic diester sufficiently proceeds when the reaction temperature is 100° C. or more, and the reaction time is 1 minute or more, preferably 10 minutes or more, and still more preferably 30 minutes or more.

When the component (a), the component (b), the optional component (c), the component (d), the component (e), and the optional component (f) are brought into contact with each other (reacted) when producing the solid catalyst component (A), a transesterification reaction in which the alkoxy groups included in the ester residues of the component (d) and the component (e) are exchanged with the alkoxy groups included in the component (a), the component (b), or the component (c) occurs, so that the phthalic diester (f) represented by the general formula (3) (hereinafter may be referred to as "component (f)") is produced. As a result, three types of internal electron donor (i.e., unreacted component (d), unreacted component (e), and unreacted component (f) or component (f) as a reaction product) are present in the component (A).

The solid catalyst component (A) is preferably produced by suspending a dialkoxymagnesium in an aromatic hydrocarbon solvent that is liquid at 20° C. (e.g., toluene) to prepare a suspension, adding the component (d) (asymmetrical phthalic diester), the component (e) (phthalic diester), and the optional component (f) (phthalic diester) to the suspension, bringing the component (b) (titanium tetrachloride) into contact with the suspension at −20 to 100° C., preferably −10 to 70° C., and more preferably 0 to 30° C., and heating and reacting the mixture at 100 to 130° C., for example. In this case, the component (c) is brought into contact with the suspension at −20 to 130° C. before or after bringing titanium tetrachloride into contact with the suspension to obtain a solid reaction product, the solid reaction product is washed with toluene or heptane, and brought into contact (reacted) with the component (b) (titanium tetrachloride) at 100 to 130° C. in the presence of an aromatic hydrocarbon solvent that is liquid at 20° C. (e.g., toluene), and the resulting reaction product is washed with a hydrocarbon solvent that is liquid at 20° C. to obtain the solid catalyst component (A). Alternatively, a dialkoxymagnesium, the component (d) (asymmetrical phthalic diester), the component (e) (phthalic diester), and the component (f) (phthalic diester) are mixed and suspended in an aromatic hydrocarbon solvent that is liquid at 20° C. (e.g., toluene) or an aliphatic hydrocarbon solvent that is liquid at 20° C. (e.g., heptane), the component (b) (titanium tetrachloride) is brought into contact with the suspension at −20 to 100° C., preferably −10 to 70° C., and more preferably 0 to 30° C., and the mixture heated and reacted at 100 to 130° C. In this case, the component (c) is brought into contact with the suspension before or after bringing titanium tetrachloride into contact with the suspension to obtain a solid reaction product. The solid reaction product is washed with an aromatic hydrocarbon solvent that is liquid at 20° C. (e.g., toluene) or an aliphatic hydrocarbon solvent that is liquid at 20° C. (e.g., heptane), and brought into contact (reacted) with the component (b) (titanium tetrachloride) at 100 to 130° C. in the presence of an aromatic hydrocarbon solvent that is liquid at 20° C. (e.g., toluene) or an aliphatic hydrocarbon solvent that is liquid at 20° C. (e.g., heptane), and the resulting reaction product is washed with a hydrocarbon solvent to obtain the solid catalyst component (A).

The ratio of the compounds are determined depending on the production method. For example, the amount of the component (b), the amount of the component (c), or the total amount of the component (b) and the component (c) is set to 0.5 to 100 mol, preferably 0.5 to 50 mol, and still more preferably 1 to 10 mol, based on 1 mol of the component (a). The total amount of the component (d) and the component (e), or the total amount of the component (d), the component (e), and the component (f) is set to 0.01 to 10 mol, preferably 0.02 to 1 mol, and still more preferably 0.02 to 0.6 mol, based on 1 mol of the component (a).

The molar ratio of the content of the component (d) to the total content of the internal electron donor in the solid catalyst component (A) may be adjusted to 0.2 to 0.8 by determining the amount of the component (d), the component (e), and the component (f) so that the molar ratio of the amount of the component (d) to the amount of the component (e), or the total amount of the component (e) and the component (f) is 2.5:7.5 to 9.7:0.3. Specifically, the molar ratio of the amount of the component (d) to the total amount of the component (d) and the component (e) or the total amount of the component (d), the component (e), and the component (f) is adjusted to about 0.25 when the molar ratio of the content of the component (d) to the total content of the internal electron donor is adjusted to 0.2. The amount of each component may be determined by fundamental experiments that confirm the molar ratio in the catalyst component using solid catalyst components obtained under different conditions close to the above conditions. The molar ratio of the amount of the component (d) to the total amount of the component (d) and the component (e) or the total amount of the component (d), the component (e), and the component (1) is adjusted to about 0.97 when the molar ratio of the content of the component (d) to the total content of the internal electron donor is adjusted to 0.8. The amount of each component may be determined by fundamental experiments that confirm the molar ratio in the catalyst component using solid catalyst components obtained under different conditions close to the above conditions.

Method for Producing Olefin Polymerization Catalyst

An olefin polymerization catalyst according to one embodiment of the invention includes (A) the solid catalyst component for olefin polymerization (solid catalyst component (A)), (B) an organoaluminum compound represented by the following general formula (4) (hereinafter may be referred to as "organoaluminum compound (B)" or "component (B)"), and (C) an external electron donor compound (hereinafter may be referred to as "external electron donor compound (C)" or "component (C)").

$$R^6_p AlQ_{3-p} \quad (4)$$

wherein $R^6$ is an alkyl group having 1 to 4 carbon atoms, Q is a hydrogen atom or a halogen atom, and p is an integer that satisfies $0<p\leq3$.

Specific examples of the organoaluminum compound (B) include triethylaluminum, diethylaluminum chloride, triisobutylaluminum, diethylaluminum bromide, and diethylaluminum hydride. These compounds may be used either alone or in combination. Among these, triethylaluminum and triisobutylaluminum are preferable.

A compound similar to the above internal electron donor compound may be used as the external electron donor compound (C). It is preferable to use an ether (e.g., 9,9-bis(methoxymethyl)fluorine or 2-isopropyl-2-isopentyl-1,3-dimethoxypropane), an ester (e.g., methyl benzoate or ethyl benzoate), or an organosilicon compound.

A compound represented by the following general formula (5) is used as the organosilicon compound.

$$R^{11}_q Si(OR^{12})_{4-q} \quad (5)$$

wherein $R^{11}$ is an alkyl group having 1 to 12 carbon atoms, a cycloalkyl group, a phenyl group, a vinyl group, an allyl group, or an aralkyl group, provided that a plurality of $R^1$ either identical or different when a plurality of $R^{11}$ are present, $R^{12}$ is an alkyl group having 1 to 4 carbon atoms, a cycloalkyl group, a phenyl group, a vinyl group, an allyl group, or an aralkyl group, provided that a plurality of $R^{12}$ are either identical or different when a plurality of $R^{12}$ are present, and q is an integer from 0 to 4.

Examples of the organosilicon compound include phenylalkoxysilanes, alkylalkoxysilanes, phenyl(alkyl)alkoxysilanes, vinylsilanes, allylsilanes, cycloalkylalkoxysilanes, cycloalkyl(alkyl)alkoxysilanes, (alkylamino)alkoxysilane, alkyl(alkylamino)alkoxysilanes, alkyl(dialkylamino)alkoxysilanes, cycloalkyl(alkylamino)alkoxysilanes, (polycyclic amino)alkoxysilanes, (alkylamino)alkylsilanes, (dialkylamino)alkylsilanes cycloalkyl(alkylamino)alkylsilanes, (polycyclic amino)alkylsilanes, and the like. In particular, di-n-propyldimethoxysilane, diisopropyldimethoxysilane, di-n-butyldimethoxysilane, diisobutyldimethoxysilane, di-t-butyldimethoxysilane, di-n-butyldiethoxysilane, t-butyltrimethoxysilane, dicyclohexyldimetoxysilane, dicyclohexyldiethoxysilane, cyclohexylmethyldimethoxysilane, cyclohexylmethyldietoxysilane, cyclohexylethyldimethoxysilane, cyclohexylethyldiethoxysilane, dicyclopentyldimethoxysilane, dicyclopenthyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, 3,5-dimethylcyclohexyl(cyclopentyl)dimethoxysilane, bis(ethylamino)methylethylsilane, t-butylmethylbis(ethylamino)silane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, bis(methylamino)di-t-butylsilane, bis(ethylamino)dicyclopentylsilane, and bis(ethylamino)diisopropylsilane are preferable. These organosilicon compounds may be used as the external electron donor compound (C) either alone or in combination.

Method for Polymerizing Olefin

An olefin may be polymerized in the presence of the olefin polymerization catalyst. Examples of the olefin include ethylene, propylene, 1-butene, 1-pentene, 4-methyl-1-pentene, vinylcyclohexane, and the like. These olefins may be used either alone or in combination. Among these, ethylene, propylene, and 1-butene are preferable, and ethylene and propylene are particularly preferable.

Propylene may be copolymerized with another olefin using the olefin polymerization catalyst according to one embodiment of the invention. Examples of the olefin copolymerized with propylene include ethylene, 1-butene, 1-pentene, 4-methyl-1-pentene, vinylcyclohexane, and the like. These olefins may be used either alone or in combination. Among these, ethylene and 1-butene are preferable.

The components are used in an arbitrary ratio as long as the advantageous effects of the invention are not adversely affected. The component (B) is normally used in an amount of 1 to 2000 mol, and preferably 50 to 1000 mol, per mol of the titanium atoms included in the solid catalyst component (A). The component (C) is used in an amount of 0.002 to 10 mol, preferably 0.01 to 2 mol, and particularly preferably 0.01 to 0.5 mol, per mol of the component (B).

The components may be brought into contact with each other in an arbitrary order. It is desirable to add the organoaluminum compound (B) to the polymerization system, bring the organosilicon compound (C) into contact with the organoaluminum compound (B), and bring the solid catalyst component (A) into contact with the mixture.

The olefin may be polymerized in the presence or absence of an organic solvent. The olefin monomer such as propylene may be used in either a gaseous state or a liquid state.

The olefin may be polymerized using a common polymerization method that is used to polymerize a 1-olefin having 2 to 10 carbon atoms. Examples of the polymerization method include a slurry polymerization method that supplies a gaseous or liquid monomer in the presence of an organic solvent to effect polymerization, a bulk polymerization method that effects polymerization in the presence of a liquid monomer such as liquefied propylene, a gas-phase polymerization method that effects polymerization in the presence of a gaseous monomer, and the like. Any of these polymerization methods may be employed. Note that it is preferable to use the gas-phase polymerization method. The polymerization method disclosed in Japanese Patent No. 2578408, the continuous gas-phase polymerization method disclosed in Japanese Patent No. 4392064 and JP-A-2009-292964, and the polymerization method disclosed in Japanese Patent No. 2766523 may also be used. The polymerization reaction may be effected batchwise or continuously. The polymerization reaction may be effected in one step, or two or more steps.

Examples of a reactor that may suitably be used to implement the method for polymerizing an olefin according to one embodiment of the invention include an autoclave equipped with a stirrer, a fluidized tank, and the like. A particulate or powdery polymer placed in the reactor in a stationary phase, and moved using a stirrer or a fluidized bed.

The molecular weight of the propylene polymer can be adjusted and set over a wide range by adding a molecular weight modifier (e.g., hydrogen) commonly used for polymerization technology. When copolymerizing propylene and another comonomer, the comonomer can be incorporated in the polymer chain by appropriately adding an alkanol having 1 to 8 carbon atoms (particularly isopropanol). A volatile liquid hydrocarbon such as propane or butane may be supplied, and vaporized in the polymerization zone in order to remove the heat of polymerization. The polymerization temperature is 200° C. or less, preferably 100° C. or less, and particularly preferably 50 to 90° C. or less. The polymerization pressure is normal pressure to 10 MPa, preferably normal pressure to 5 MPa, and particularly preferably 1 to 4 MPa. When copolymerizing propylene and another comonomer, the partial pressure of propylene and the comonomer is adjusted to 1:99 to 99:1. The partial pressure of propylene and the comonomer is preferably adjusted to 50:50 to 99:1.

When polymerizing an olefin using the catalyst that includes the solid catalyst component (A), the component (B), and the component (C) (hereinafter may be referred to as "main polymerization"), it is desirable to effect preliminary polymerization prior to the main polymerization in order to further improve the catalytic activity, the stereoregularity, the particle properties of the resulting polymer, and the like. The olefin that is subjected to the main polymerization or a monomer such as styrene may be used for the preliminary polymerization.

The components and the monomer may be brought into contact with each other in an arbitrary order during the preliminary polymerization. Note that it is preferable to add the component (B) to the preliminary polymerization system containing an inert gas atmosphere or an olefin gas atmosphere, bring the solid catalyst component (A) into contact with the component (B), and then bring the olefin (e.g., propylene) or a mixture of the olefin (e.g., propylene) and one or more additional olefins into contact with the mixture. When effecting the preliminary polymerization using the component (C), it is desirable to add the component (B) to the preliminary polymerization system containing an inert gas atmosphere or an olefin gas atmosphere, bring the component (C) into contact with the component (B), bring the solid catalyst component (A) into contact with the mixture, and then bring the olefin (e.g., propylene) or a mixture of the olefin (e.g., propylene) and one or more additional olefins into contact with the mixture.

When polymerizing an olefin in the presence of the olefin polymerization catalyst produced according to one embodiment of the invention, the initial activity is low, and the activity can be maintained for a long time as compared with the case of using a known catalyst. Moreover, the amount of fine powder and coarse powder produced is small.

The invention is further described below by way of examples. Note that the following examples are for illustration purposes only, and the invention is not limited to the following examples.

EXAMPLE 1

Production of Solid Catalyst Component (a)

A 500 ml round-bottom flask equipped with a stirrer, of which the internal atmosphere had been sufficiently replaced with nitrogen gas, was charged with 60 ml of titanium tetrachloride and 50 ml of toluene to prepare a solution. A suspension prepared using 20 g of diethoxymagnesium, 70 ml of toluene, 9.1 mmol (2.1 ml) of ethyl-n-butyl phthalate, and 11.3 mmol (3.0 ml) of di-n-butyl phthalate was added to the solution that was held at −5° C. The mixture was held at −5° C. for 1 hour, heated from −5° C. to 10° C. over 20 minutes, held at 10° C. for 1 hour, heated from 10° C. to 110° C. over 90 minutes, and reacted at 110° C. for 2 hours with stirring. After completion of the reaction, the resulting solid product was washed four times with 167 ml of toluene (100° C.). After the addition of 123 ml of toluene (room temperature) and 20 ml of titanium tetrachloride, the mixture was heated to 110° C., and reacted for 15 minutes with stirring. After completion of the reaction, the supernatant liquid was removed. After repeating the above operation twice, the mixture was washed eight times with 125 ml of n-heptane (40° C.) to obtain a solid catalyst component. The titanium content in the solid catalyst component was measured, and found to be 2.3 wt %. The ethyl-n-butyl phthalate content in the solid catalyst component was 3.2 wt %, the di-n-butyl phthalate content in the solid catalyst component was 4.2 wt %, and the diethyl phthalate content in the solid catalyst component was 2.8 wt %. The molar ratio of the total content of the asymmetrical phthalic diester to the total content of the internal electron donor was 0.32. The phthalic diester content was measured by the method described below.

Preparation of Polymerization Catalyst and Gas-Phase Polymerization

A 2.0 l autoclave equipped with a stirrer, of which the internal atmosphere had been completely replaced with nitrogen gas, was charged with 2.2 mmol of triethylaluminum, 0.083 mmol of cyclohexylmethyldimethoxysilane (CM-DMSi), and the solid catalyst component dispersed in n-heptane in an amount equivalent to 0.0055 mmol of titanium atoms to obtain a polymerization catalyst. After the addition of hydrogen gas (pressure: 0.007 MPa) and propylene (pressure: 0.1 MPa), polymerization was effected at 20° C. for 10 minutes. The mixture was then heated to 80° C., and subjected to gas-phase polymerization at a pressure of 2.8 MPa for 1 hour. The gas-phase polymerization activity, the maximum propylene reaction rate, and the xylene-soluble content (23° C.) (XS, wt %) were measured by the following methods using the resulting polymer. The catalyst composition and the polymerization results are shown in Tables 1 and 2.

Phthalic Diester Content

The phthalic diester content in the solid catalyst component was measured using a gas chromatograph ("GC-14B"

manufactured by Shimadzu Corporation) under the following conditions. The number of moles of each component was calculated from the gas chromatography measurement results using a calibration curve that was drawn in advance using the measurement results at a known concentration.

Measurement Conditions

Column: packed column (2.6 mm (diameter)×2.1 m, Silicone SE-30 10%, Chromosorb WAW DMCS 80/100, manufactured by GL Sciences Inc.)

Detector: flame ionization detector (FID)

Carrier gas: helium, flow rate: 40 ml/min

Measurement temperature: vaporization chamber: 280° C., column: 225° C., detector: 280° C.

Catalytic Activity of Solid Catalyst Component

The catalytic activity (G) that indicates the amount (F) (g) of polymer produced per gram of the solid catalyst component within 1 hour was calculated by the following expression.

Catalytic activity($G$)=polymer produced($F$)(g)/solid catalyst component(g)/1 hour Measurement of Propylene Reaction Rate A 1.8 l autoclave equipped with a stirrer, of which the internal atmosphere had been completely replaced with nitrogen gas, was charged with 0.26 mmol of triethylaluminum, 0.024 mmol of cyclohexylmethyldimethoxysilane (CM-DMSi), and the solid catalyst component dispersed in mineral oil in an amount equivalent to 0.0024 mmol of titanium atoms to obtain a polymerization catalyst. After the addition of 9 mmol of hydrogen gas and propylene (pressure: 0.80 MPa), the mixture was heated to 80° C., and subjected to gas-phase polymerization at a pressure of 2.8 MPa for 1 hour. The propylene absorption rate (1/min) was sequentially measured during polymerization using a massflow meter. The propylene reaction rate was calculated by the following expression on the assumption that the propylene reaction rate is in proportional to the propylene absorption rate.

Propylene reaction rate(kg-$C^3$/g-catalyst·time)=propylene absorption rate(1/min)×60(min/time)/22.4(1/mol)×42(g/mol)/solid catalyst component(g)/1000(kg/g)

The maximum value H (kg-$C^3$/g-catalyst·time) recorded when measuring the reaction rate was divided by the catalytic activity G (kg-PP/g-catalyst) of the solid catalyst component to obtain the value (H/G ratio), which was taken as an index for determining the likelihood of rapid polymerization in the initial stage of polymerization.

p-Xylene-soluble Content (XS, Wt %) in Polymer 4.0 g of the polymer was added to 200 ml of p-xylene, and dissolved over 2 hours at the boiling point (138° C.) of toluene. The solution was cooled to 23° C., and an insoluble component and a soluble component were separated by filtration. After evaporating the solvent from the soluble component, the residue was dried by heating, and the resulting polymer was determined to be the p-xylene-soluble component. The amount of the p-xylene-soluble component was indicated by a value (XS, wt %) relative to the amount (F) of the polymer.

EXAMPLE 2

A solid catalyst component was produced, a polymerization catalyst was prepared, and gas-phase polymerization was effected in the same manner as in Example 1, except that 12.5 mmol (2.9 ml) of ethyl-n-butyl phthalate was used instead of 9.1 mmol of ethyl-n-butyl phthalate, and 6.4 mmol (1.7 ml) of di-n-butyl phthalate was used instead of 11.3 mmol of di-n-butyl phthalate. The titanium content in the resulting solid catalyst component was 2.4 wt %, the ethyl-n-butyl phthalate content in the solid catalyst component was 4.4 wt %, the di-n-butyl phthalate content in the solid catalyst component was 2.0 wt %, and the diethyl phthalate content in the solid catalyst component was 3.2 wt %. The molar ratio of the total content of the asymmetrical phthalic diester to the total content of the internal electron donor was 0.45. The catalyst composition and the polymerization results are shown in Tables 1 and 2.

EXAMPLE 3

A solid catalyst component was produced, a polymerization catalyst was prepared, and gas-phase polymerization was effected in the same manner as in Example 1, except that 15.1 mmol (3.5 ml) of ethyl-n-butyl phthalate was used instead of 9.1 mmol of ethyl-n-butyl phthalate, and 0.8 mmol (0.2 ml) of di-n-butyl phthalate was used instead of 11.3 mmol of di-n-butyl phthalate. The titanium content in the resulting solid catalyst component was 2.1 wt %, the ethyl-n-butyl phthalate content in the solid catalyst component was 5.7 wt %, the di-n-butyl phthalate content in the solid catalyst component was 0.4 wt %, and the diethyl phthalate content in the solid catalyst component was 3.3 wt %. The molar ratio of the total content of the asymmetrical phthalic diester to the total content of the internal electron donor was 0.59. The catalyst composition and the polymerization results are shown in Tables 1 and 2.

EXAMPLE 4

A solid catalyst component was produced, a polymerization catalyst was prepared, and gas-phase polymerization was effected in the same manner as in Example 1, except that 5.2 mmol (1.2 ml) of ethyl-n-butyl phthalate was used instead of 9.1 mmol of ethyl-n-butyl phthalate, and 12.8 mmol (3.4 ml) of di-n-butyl phthalate was used instead of 11.3 mmol of di-n-butyl phthalate. The titanium content in the resulting solid catalyst component was 2.1 wt %, the ethyl-n-butyl phthalate content in the solid catalyst component was 2.4 wt %, the di-n-butyl phthalate content in the solid catalyst component was 5.0 wt %, and the diethyl phthalate content in the solid catalyst component was 2.0 wt %. The molar ratio of the total content of the asymmetrical phthalic diester to the total content of the internal electron donor was 0.26. The catalyst composition and the polymerization results are shown in Tables 1 and 2.

EXAMPLE 5

A solid catalyst component was produced, a polymerization catalyst was prepared, and gas-phase polymerization was effected in the same manner as in Example 1, except that 10.4 mmol (2.4 ml) of ethyl-n-butyl phthalate was used instead of 9.1 mmol of ethyl-n-butyl phthalate, and 10.5 mmol (2.8 ml) of di-n-butyl phthalate was used instead of 11.3 mmol of di-n-butyl phthalate. The titanium content in the resulting solid catalyst component was 2.3 wt %, the ethyl-n-butyl phthalate content in the solid catalyst component was 4.0 wt %, the di-n-butyl phthalate content in the solid catalyst component was 4.0 wt %, and the diethyl phthalate content in the solid catalyst component was 2.0 wt %. The molar ratio of the total content of the asymmetrical phthalic diester to the total content of the internal electron donor was 0.41. The catalyst composition and the polymerization results are shown in Tables 1 and 2.

EXAMPLE 6

A solid catalyst component was produced, a polymerization catalyst was prepared, and gas-phase polymerization was effected in the same manner as in Example 1, except that 15.6 mmol (3.6 ml) of ethyl-n-butyl phthalate was used instead of 9.1 mmol of ethyl-n-butyl phthalate, and 6.8 mmol (1.8 ml) of di-n-butyl phthalate was used instead of 11.3 mmol of di-n-butyl phthalate. The titanium content in the resulting solid catalyst component was 2.1 wt %, the ethyl-n-butyl phthalate content in the solid catalyst component was 6.3 wt %, the di-n-butyl phthalate content in the solid catalyst component was 2.6 wt %, and the diethyl phthalate content in the solid catalyst component was 1.7 wt %. The molar ratio of the total content of the asymmetrical phthalic diester to the total content of the internal electron donor was 0.60. The catalyst composition and the polymerization results are shown in Tables 1 and 2.

EXAMPLE 7

A solid catalyst component was produced, a polymerization catalyst was prepared, and gas-phase polymerization was effected in the same manner as in Example 1, except that 21.6 mmol (5.0 ml) of ethyl-n-butyl phthalate was used instead of 9.1 mmol of ethyl-n-butyl phthalate, and 2.3 mmol (0.6 ml) of di-n-butyl phthalate was used instead of 11.3 mmol of di-n-butyl phthalate. The titanium content in the resulting solid catalyst component was 2.3 wt %, the ethyl-n-butyl phthalate content in the solid catalyst component was 7.8 wt %, the di-n-butyl phthalate content in the solid catalyst component was 1.1 wt %, and the diethyl phthalate content in the solid catalyst component was 1.5 wt %. The molar ratio of the total content of the asymmetrical phthalic diester to the total content of the internal electron donor was 0.74. The catalyst composition and the polymerization results are shown in Tables 1 and 2.

EXAMPLE 8

A solid catalyst component was produced, a polymerization catalyst was prepared, and gas-phase polymerization was effected in the same manner as in Example 1, except that 5.6 mmol (1.3 ml) of ethyl-n-butyl phthalate was used instead of 9.1 mmol of ethyl-n-butyl phthalate, 10.9 mmol (2.9 ml) of di-n-butyl phthalate was used instead of 11.3 mmol of di-n-butyl phthalate, and 2.0 mmol (0.4 ml) of diethyl phthalate was additionally used. The titanium content in the resulting solid catalyst component was 2.3 wt %, the ethyl-n-butyl phthalate content in the solid catalyst component was 2.1 wt %, the di-n-butyl phthalate content in the solid catalyst component was 4.8 wt %, and the diethyl phthalate content in the solid catalyst component was 2.3 wt %. The molar ratio of the total content of the asymmetrical phthalic diester to the total content of the internal electron donor was 0.24. The catalyst composition and the polymerization results are shown in Tables 1 and 2.

EXAMPLE 9

A solid catalyst component was produced, a polymerization catalyst was prepared, and gas-phase polymerization was effected in the same manner as in Example 8, except that 19.0 mmol (4.4 ml) of ethyl-n-butyl phthalate was used instead of 5.6 mmol (1.3 ml) of ethyl-n-butyl phthalate, 2.3 mmol (0.6 ml) of di-n-butyl phthalate was used instead of 10.9 mmol (2.9 ml) of di-n-butyl phthalate, and 2.5 mmol (0.5 ml) of diethyl phthalate was used instead of 2.0 mmol (0.4 ml) of diethyl phthalate. The titanium content in the resulting solid catalyst component was 2.4 wt %, the ethyl-n-butyl phthalate content in the solid catalyst component was 6.2 wt %, the di-n-butyl phthalate content in the solid catalyst component was 0.8 wt %, and the diethyl phthalate content in the solid catalyst component was 3.5 wt %. The molar ratio of the total content of the asymmetrical phthalic diester to the total content of the internal electron donor was 0.57. The catalyst composition and the polymerization results are shown in Tables 1 and 2.

EXAMPLE 10

A solid catalyst component was produced, a polymerization catalyst was prepared, and gas-phase polymerization was effected in the same manner as in Example 8, except that 6.9 mmol (1.6 ml) of ethyl-n-butyl phthalate was used instead of 5.6 mmol (1.3 ml) of ethyl-n-butyl phthalate, 1.9 mmol (0.5 ml) of di-n-butyl phthalate was used instead of 10.9 mmol (2.9 ml) of di-n-butyl phthalate, and 8.6 mmol (1.7 ml) of diethyl phthalate was used instead of 2.0 mmol (0.4 ml) of diethyl phthalate. The titanium content in the resulting solid catalyst component was 2.1 wt %, the ethyl-n-butyl phthalate content in the solid catalyst component was 2.8 wt %, the di-n-butyl phthalate content in the solid catalyst component was 0.9 wt %, and the diethyl phthalate content in the solid catalyst component was 5.6 wt %. The molar ratio of the total content of the asymmetrical phthalic diester to the total content of the internal electron donor was 0.28. The catalyst composition and the polymerization results are shown in Tables 1 and 2.

COMPARATIVE EXAMPLE 1

A solid catalyst component was produced, a polymerization catalyst was prepared, and gas-phase polymerization was effected in the same manner as in Example 1, except that 18.0 mmol (4.8 ml) of di-n-butyl phthalate was used instead of 9.1 mmol of ethyl-n-butyl phthalate and 11.3 mmol of di-n-butyl phthalate. The titanium content in the resulting solid catalyst component was 2.3 wt %, the ethyl-n-butyl phthalate content in the solid catalyst component was 1.8 wt %, the di-n-butyl phthalate content in the solid catalyst component was 8.8 wt %, and the diethyl phthalate content in the solid catalyst component was 0.6 wt %. The molar ratio of the total content of the asymmetrical phthalic diester to the total content of the internal electron donor was 0.17. The catalyst composition and the polymerization results are shown in Tables 1 and 2.

COMPARATIVE EXAMPLE 2

A solid catalyst component was produced, a polymerization catalyst was prepared, and gas-phase polymerization was effected in the same manner as in Example 1, except that 19.0 mmol (4.4 ml) of ethyl-n-butyl phthalate was used instead of 9.1 mmol of ethyl-n-butyl phthalate and 11.3 mmol of di-n-butyl phthalate. The titanium content in the resulting solid catalyst component was 2.0 wt %, the ethyl-n-butyl phthalate content in the solid catalyst component was 7.6 wt %, and the diethyl phthalate content in the solid catalyst component was 1.6 wt %. The molar ratio of the total content of the asymmetrical phthalic diester to the total content of the internal electron donor was 0.81. The catalyst composition and the polymerization results are shown in Tables 1 and 2.

COMPARATIVE EXAMPLE 3

A solid catalyst component was produced, a polymerization catalyst was prepared, and gas-phase polymerization was effected in the same manner as in Example 1, except that 17.7 mmol (7.0 ml) of bis(2-ethylhexyl) phthalate and 10.1 mmol (2.0 ml) of diethyl phthalate were used instead of 9.1 mmol of ethyl-n-butyl phthalate and 11.3 mmol of di-n-butyl phthalate. The titanium content in the resulting solid catalyst component was 2.5 wt %, the ethyl-2-ethylhexyl phthalate content in the solid catalyst component was 3.0 wt %, the di-2-ethylhexyl phthalate content in the solid catalyst component was 2.6 wt %, and the diethyl phthalate content in the solid catalyst component was 6.3 wt %. The molar ratio of the total content of the asymmetrical phthalic diester to the total content of the internal electron donor was 0.22. The catalyst composition and the polymerization results are shown in Tables 1 and 2.

COMPARATIVE EXAMPLE 4

A solid catalyst component was produced, a polymerization catalyst was prepared, and gas-phase polymerization was effected in the same manner as in Example 1, except that 22.7 mmol (9.0 ml) of bis(2-ethylhexyl) phthalate and 5.0 mmol (1.0 ml) of diethyl phthalate were used instead of 9.1 mmol of ethyl-n-butyl phthalate and 11.3 mmol of di-n-butyl phthalate. The titanium content in the resulting solid catalyst component was 2.6 wt %, the ethyl-2-ethylhexyl phthalate content in the solid catalyst component was 4.7 wt %, the di-2-ethylhexyl phthalate content in the solid catalyst component was 2.4 wt %, and the diethyl phthalate content in the solid catalyst component was 4.9 wt %. The molar ratio of the total content of the asymmetrical phthalic diester to the total content of the internal electron donor was 0.35. The catalyst composition and the polymerization results are shown in Tables 1 and 2.

COMPARATIVE EXAMPLE 5

A solid catalyst component was produced, a polymerization catalyst was prepared, and gas-phase polymerization was effected in the same manner as in Example 1, except that 18.0 mmol (5.2 ml) of ethyl-2-ethylhexyl phthalate was used instead of 9.1 mmol of ethyl-n-butyl phthalate and 11.3 mmol of di-n-butyl phthalate. The titanium content in the resulting solid catalyst component was 2.2 wt %, the ethyl-2-ethylhexyl phthalate content in the solid catalyst component was 7.3 wt %, and the diethyl phthalate content in the solid catalyst component was 2.8 wt %. The molar ratio of the total content of the asymmetrical phthalic diester to the total content of the internal electron donor was 0.65. The catalyst composition and the polymerization results are shown in Tables 1 and 2.

EXAMPLE 11

A polymerization catalyst was prepared, and polymerization was effected in the same manner as in Example 1, except that diisopropyldimethoxysilane (DIPDMSi) was used for gas-phase polymerization and the measurement of the propylene reaction rate instead of cyclohexylmethyldimethoxysilane (CMDMSi). The polymerization results are shown in Table 2.

EXAMPLE 12

A polymerization catalyst was prepared, and polymerization was effected in the same manner as in Example 1, except that isopropylisobutyldimethoxysilane (IPIBDMSi) was used for gas-phase polymerization and the measurement of the propylene reaction rate instead of cyclohexylmethyldimethoxysilane (CMDMSi). The polymerization results are shown in Table 2.

EXAMPLE 13

A polymerization catalyst was prepared, and polymerization was effected in the same manner as in Example 1, except that dicyclopentyldimethoxysilane (DCPDMSi) was used for gas-phase polymerization and the measurement of the propylene reaction rate instead of cyclohexylmethyldimethoxysilane (CMDMSi). The polymerization results are shown in Table 2.

EXAMPLE 14

A polymerization catalyst was prepared, and polymerization was effected in the same manner as in Example 1, except that t-butylmethyldimethoxysilane (tBMDMSi) was used for gas-phase polymerization and the measurement of the propylene reaction rate instead of cyclohexylmethyldimethoxysilane (CMDMSi). The polymerization results are shown in Table 2.

EXAMPLE 15

A polymerization catalyst was prepared, and polymerization was effected in the same manner as in Example 1, except that diethylaminotrimethoxysilane (DEATESi) was used for gas-phase polymerization and the measurement of the propylene reaction rate instead of cyclohexylmethyldimethoxysilane (CMDMSi). The polymerization results are shown in Table 2.

EXAMPLE 16

A polymerization catalyst was prepared, and polymerization was effected in the same manner as in Example 1, except that bis(perhydroisoquinolino)dimethoxysilane (BPIQ) was used for gas-phase polymerization and the measurement of the propylene reaction rate instead of cyclohexylmethyldimethoxysilane (CMDMSi). The polymerization results are shown in Table 2.

EXAMPLE 17

A polymerization catalyst was prepared, and polymerization was effected in the same manner as in Example 1, except that bis(ethylamino)dicyclopentylsilane (BEADCSi) was used for gas-phase polymerization and the measurement of the propylene reaction rate instead of cyclohexylmethyldimethoxysilane (CMDMSi). The polymerization results are shown in Table 2.

TABLE 1

| | Ti content (wt %) | Electron donor included in catalyst (wt %) | | | Content ratio of component (d) (mol/mol) |
|---|---|---|---|---|---|
| | | Phthalic diester (d) represented by general formula (1) | Phthalic diester (e) represented by general formula (2) | Phthalic diester (f) represented by general formula (3) | |
| Example 1 | 2.3 | 3.2 | 4.2 | 2.8 | 0.32 |
| Example 2 | 2.4 | 4.4 | 2.0 | 3.2 | 0.45 |
| Example 3 | 2.1 | 5.7 | 0.4 | 3.3 | 0.59 |
| Example 4 | 2.1 | 2.4 | 5.0 | 2.0 | 0.26 |
| Example 5 | 2.3 | 4.0 | 4.0 | 2.0 | 0.41 |
| Example 6 | 2.1 | 6.3 | 2.6 | 1.7 | 0.60 |
| Example 7 | 2.3 | 7.8 | 1.1 | 1.5 | 0.74 |
| Example 8 | 2.0 | 2.1 | 4.8 | 2.3 | 0.24 |
| Example 9 | 2.4 | 6.2 | 0.8 | 3.5 | 0.57 |
| Example 10 | 2.1 | 2.8 | 0.9 | 5.6 | 0.28 |
| Comparative Example 1 | 2.3 | 1.8 | 8.8 | 0.6 | 0.17 |
| Comparative Example 2 | 2.0 | 7.6 | — | 1.6 | 0.81 |
| Comparative Example 3 | 2.5 | 3.0*[1] | 2.6*[2] | 6.3 | 0.24 |
| Comparative Example 4 | 2.6 | 4.7*[1] | 2.4*[2] | 4.9 | 0.38 |
| Comparative Example 5 | 2.2 | 7.3*[1] | — | 2.8 | 0.70 |

*[1]Content (%) of ethyl-2-ethylhexyl phthalate
*[2]Content (%) of di-2-ethylhexyl phthalate

TABLE 2

| | External electron donor (C) during polymerization | Gas-phase polymerization activity G (kg-PP/g-catalyst) | Maximum propylene reaction rate H (kg-$C^3$/g-catalyst·time) | XS (wt %) | H/G ratio |
|---|---|---|---|---|---|
| Example 1 | CMDMSi | 34.2 | 71.2 | 1.4 | 2.1 |
| Example 2 | | 37.3 | 75.7 | 1.5 | 2.0 |
| Example 3 | | 38.1 | 72.8 | 1.3 | 1.9 |
| Example 4 | | 30.8 | 64.2 | 1.4 | 2.1 |
| Example 5 | | 35.2 | 71.4 | 1.6 | 2.0 |
| Example 6 | | 37.6 | 74.5 | 1.2 | 2.0 |
| Example 7 | | 35.1 | 72.0 | 1.6 | 2.1 |
| Example 8 | | 31.9 | 67.1 | 1.3 | 2.1 |
| Example 9 | | 38.6 | 76.7 | 1.4 | 2.0 |
| Example 10 | | 31.7 | 65.6 | 1.3 | 2.1 |
| Comparative Example 1 | | 23.2 | 59.1 | 1.5 | 2.5 |
| Comparative Example 2 | | 27.4 | 64.5 | 1.4 | 2.4 |
| Comparative Example 3 | | 24.2 | 61.6 | 1.8 | 2.5 |
| Comparative Example 4 | | 26.5 | 65.3 | 2.0 | 2.5 |
| Comparative Example 5 | | 27.2 | 67.5 | 1.9 | 2.5 |
| Example 11 | DIPDMSi | 36.2 | 73.6 | 1.1 | 2.0 |
| Example 12 | IPIBDMSi | 35.8 | 72.5 | 1.1 | 2.0 |
| Example 13 | DCPDMSi | 37.6 | 79.1 | 0.9 | 2.1 |
| Example 14 | tBMDMSi | 35.7 | 76.2 | 1.2 | 2.1 |
| Example 15 | DEATESi | 32.9 | 63.4 | 1.5 | 1.9 |
| Example 16 | BPIQ | 30.5 | 59.8 | 1.6 | 2.0 |
| Example 17 | BEADCSi | 30.8 | 62.5 | 1.7 | 2.0 |

As is clear from the results shown in Table 2, the solid catalyst components according to the examples maintained activity for a long time when used for gas-phase polymerization of propylene, and the reaction rate in the initial stage of polymerization was suppressed relative to the polymerization activity (see the H/G ratio). Moreover, excellent stereospecificity was obtained. In addition, the amount of fine powder and coarse powder produced was small.

The olefin polymerization catalysts according to the examples exhibited high catalytic activity when used for gas-phase polymerization of propylene, and the reaction rate in the initial stage of polymerization was suppressed relative to the polymerization activity (see the H/G ratio). Therefore, polypropylene having stereoregularity can be obtained using the olefin polymerization catalysts.

The invention claimed is:
1. A solid catalyst component for olefin polymerization, comprising:
  magnesium;
  titanium;
  a halogen; and
  an internal electron donor, wherein the internal electron donor comprises an asymmetrical phthalic diester represented by formula (1) in a molar ratio of 0.2 to 0.8 relative to a total content of the internal electron donor, $$R^1_k(C_6H_{4-k})(COOR^2)(COOR^3) \tag{1}$$

where $R^1$ is a halogen atom or an alkyl group having 1 to 20 carbon atoms, $R^2$ is a linear or branched alkyl group having 2 to 6 carbon atoms, or an alkenyl group, $R^3$ is a linear or branched alkyl group having 1 to 5 carbon atoms, the number of carbon atoms included in $R^3$ is smaller than the number of carbon atoms included in $R^2$, and k is an integer from 0 to 4.

2. The solid catalyst component according to claim 1, wherein the internal electron donor further comprises at least one of a phthalic diester represented by formula (2) and a phthalic diester represented by formula (3), $$R^4_m(C_6H_{4-m})(COOR^2)_2 \tag{2}$$

where each $R^2$ is a linear or branched alkyl group having 2 to 6 carbon atoms, or an alkenyl group and is identical to each other, $R^4$ is a halogen atom or an alkyl group having 1 to 20 carbon atoms, and m is an integer from 0 to 4, $$R^5_n(C_6H_{4-n})(COOR^3)_2 \tag{3}$$

where each $R^3$ is linear or branched alkyl group having 1 to 5 carbon atoms and is identical to each other, $R^5$ is a halogen atom or an alkyl group having 1 to 20 carbon atoms, and n is an integer from 0 to 4.

3. An olefin polymerization catalyst, comprising:
the solid catalyst component according to claim 1;
an organoaluminum compound represented by formula (4), $$R^6_pALQ_{3-p} \tag{4}$$

wherein $R^6$ is an alkyl group having 1 to 4 carbon atoms, Q is a hydrogen atom or a halogen atom, and p is an integer that satisfies 0<p≤3; and
an external electron donor compound.

4. The olefin polymerization catalyst according to claim 3, wherein the external electron donor compound is an organosilicon compound represented by formula (5), $$R^7_qSi(OR^8)_{4-q} \tag{5}$$

where $R^7$ is an alkyl group having 1 to 12 carbon atoms, a cycloalkyl group, a phenyl group, a vinyl group, an allyl group, or an aralkyl group, a plurality of $R^7$, if present, are either identical or different, $R^8$ is an alkyl group having 1 to 4 carbon atoms, a cycloalkyl group, a phenyl group, a vinyl group, an allyl group, or an aralkyl group, a plurality of $R^8$, if present, are either identical or different, and q is an integer from 0 to 4.

5. An olefin polymerization catalyst, comprising:
the solid catalyst component according to claim 2;
an organoaluminum compound represented by formula (4), $$R^6_pAlQ_{3-p} \tag{4}$$

where $R^6$ is an alkyl group having 1 to 4 carbon atoms, Q is a hydrogen atom or a halogen atom, and p is an integer that satisfies 0<p≤3; and
an external electron donor compound.

6. The olefin polymerization catalyst according to claim 5, wherein the external electron donor compound is an organosilicon compound represented by formula (5), $$R^7_qSi(OR^8)_{4-q} \tag{5}$$

where $R^7$ is an alkyl group having 1 to 12 carbon atoms, a cycloalkyl group, a phenyl group, a vinyl group, an allyl group, or an aralkyl group, a plurality of $R^7$, if present, are either identical or different, $R^8$ is an alkyl group having 1 to 4 carbon atoms, a cycloalkyl group, a phenyl group, a vinyl group, an allyl group, or an aralkyl group, a plurality of $R^8$, if present, are either identical or different, and q is an integer from 0 to 4.

7. The solid catalyst component according to claim 2, wherein the internal electron donor further comprises the phthalic diester represented by formula (2) and the phthalic diester represented by formula (3).

8. The solid catalyst component according to claim 1, wherein the internal electron donor comprises the asymmetrical phthalic diester represented by formula (1) in the molar ratio of 0.3 to 0.8 relative to the total content of the internal electron donor.

9. The solid catalyst component according to claim 1, wherein the internal electron donor comprises the asymmetrical phthalic diester represented by formula (1) in the molar ratio of 0.45 to 0.7 relative to the total content of the internal electron donor.

10. The solid catalyst component according to claim 1, wherein the magnesium is included in an amount of 10 to 30 wt %, the titanium is included in an amount of 1 to 8 wt %, the halogen is included in an amount of 45 to 70 wt %, and the internal electron donor is included in an amount of 2 to 25 wt %.

11. The solid catalyst component according to claim 1, wherein the magnesium is included in an amount of 15 to 25 wt %, the titanium is included in an amount of 2 to 4 wt %, the halogen is included in an amount of 55 to 65 wt %, and the internal electron donor is included in an amount of 5 to 20 wt %.

* * * * *